(12) United States Patent
Brogden et al.

(10) Patent No.: US 11,254,623 B2
(45) Date of Patent: Feb. 22, 2022

(54) HIGH FIDELITY SHEET EXPLOSIVE SIMULANTS

(71) Applicant: The Government of the United States of America, as represented by the Secretary of Homeland Security, Washington, DC (US)

(72) Inventors: Michael Brogden, Galloway, NJ (US); Steve Duffy, Hammonton, NJ (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/193,370

(22) Filed: Mar. 5, 2021

(65) Prior Publication Data
US 2021/0188732 A1    Jun. 24, 2021

Related U.S. Application Data

(63) Continuation of application No. 15/604,716, filed on May 25, 2017, now Pat. No. 10,941,085.

(51) Int. Cl.
| | |
|---|---|
| *C06B 23/00* | (2006.01) |
| *C08L 23/08* | (2006.01) |
| *C08K 3/38* | (2006.01) |
| *C08K 3/26* | (2006.01) |
| *C08K 3/22* | (2006.01) |

(52) U.S. Cl.
CPC ............ *C06B 23/001* (2013.01); *C08K 3/38* (2013.01); *C08L 23/0853* (2013.01); *C08K 2003/2244* (2013.01); *C08K 2003/2265* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 4,678,607 A | 7/1987 | Reitz | |
| 5,589,028 A * | 12/1996 | Robinson | ............ B32B 37/1207 |
| | | | 156/306.6 |
| 5,958,299 A * | 9/1999 | Kury | .................... F41H 11/134 |
| | | | 252/408.1 |
| 8,857,340 B2 | 10/2014 | Hagit et al. | |
| 2009/0194744 A1 | 8/2009 | Adebimpe | |

* cited by examiner

*Primary Examiner* — Aileen B Felton
(74) *Attorney, Agent, or Firm* — Lavanya Ratnam; Kelly G. Hyndman; Robert W. Busby

(57) ABSTRACT

An explosive sheet simulant that uses an ethylene vinyl acetate polymer combined with a mixture of a boron carbide and iron oxide for X-ray attenuating properties, and components of the mixture selected for predetermined flexural modulus combined with particle density, effective atomic number, X-ray transmission properties, or millimeter wave properties.

12 Claims, 1 Drawing Sheet

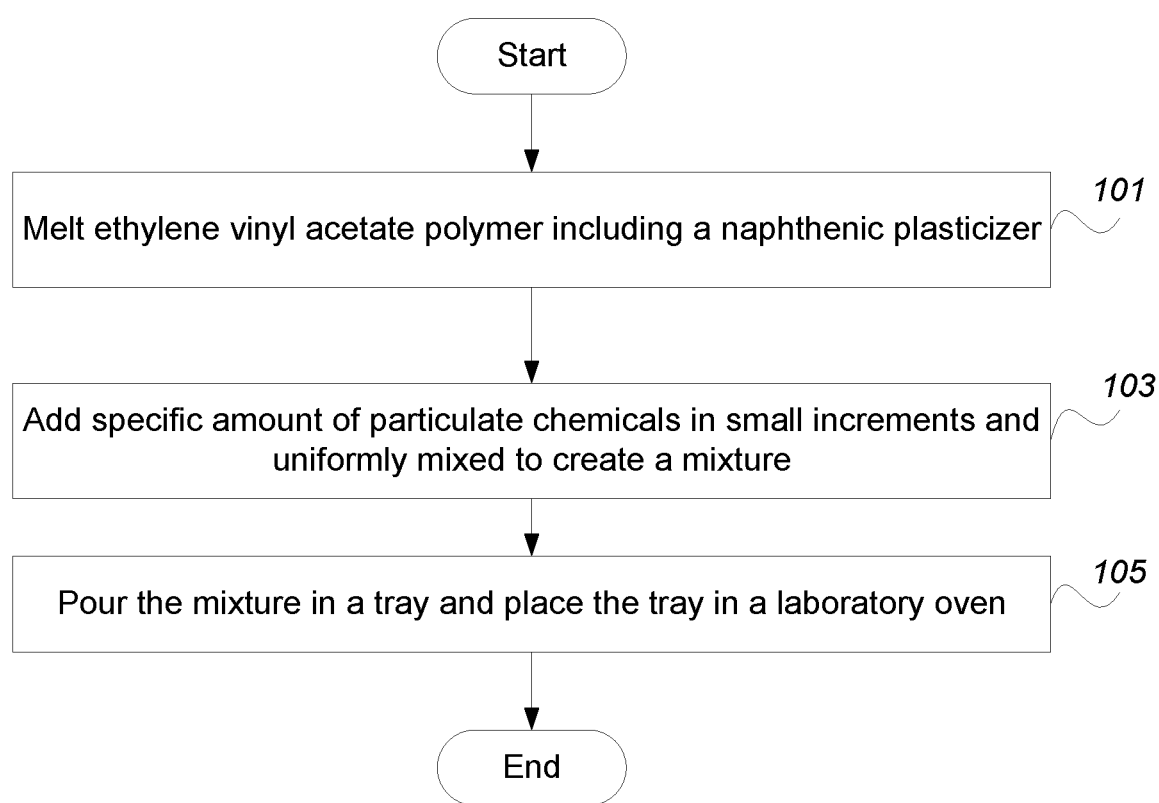

HIGH FIDELITY SHEET EXPLOSIVE SIMULANTS

CROSS-REFERENCE TO RELATED APPLICATIONS

This application is a continuation of and claims the benefit under 35 U. S.C. § 120 to U.S. patent application Ser. No. 15/604,716, filed May 25, 2017, entitled "High Fidelity Sheet Explosive Simulants," and scheduled for issue on Mar. 9, 2021, as U.S. Pat. No. 10,941,085, and is hereby incorporated by reference in its entirety.

STATEMENT OF GOVERNMENT INTEREST

This invention was made with United States Government support, by employees of the United States Department of Homeland Security in the performance of their official duties. The United States Government has certain rights in this invention.

FIELD

This application relates generally to improvements to explosive simulants. More particularly the present disclosure relates to improvements relating to polymer based sheet simulants for explosive detection systems that use advanced image technologies.

BACKGROUND

Explosive simulants are commonly used to field test various explosive detection systems and to train operators of such equipment. Explosive simulants are largely designed for X-ray imaging and explosive detection system (EDS) platforms, where a simulant's X-ray parameters are matched to those of an explosive. The EDS is commonly used to identify explosives in luggage and not particularly those on a human. However, the EDS lack focus on aspects such as edge effects, compressibility, and flexibility of an explosive. Generalizations are made for matching simulant and explosive morphology, but little has been done to determine the effect morphology has on AIT detection algorithms and to validate the morphology between an explosive and simulant. Tactile properties have not been as critical in EDS simulant development compared to the development of simulants used for more advanced explosive detection systems, such as Advanced Imaging Technology (AIT) portals.

Both X-ray backscatter and MMW based AIT portals require validated simulants for testing and development. MMW simulants are conceptually developed in a similar manner as X-ray simulants. However, different technologies are used for measuring and validating the materials. When used in MMW based AIT portals, simulants and explosives with similar dielectric properties produce similar grayscale responses. Regardless of the MMW dielectric response or the X-ray backscatter response, the AIT algorithm threat detection relies heavily upon anomaly identification. AIT portals use detection algorithms that rely heavily on anomaly detection algorithms. Therefore, it is imperative that simulants mimic and behave in a manner similar to that of the actual explosive that the simulant is meant to simulate. As such, when developing simulants for AIT portals, there is an ever increasing need for simulants to match the flexural properties of explosives in order for the simulants to be indistinguishable from live explosives. AIT portals use two distinct technologies: backscatter X-rays and millimeter wave (MMW) scanning.

Image capture devices such as video cameras can promote public safety and security. However, some applications may present arguable concerns as to privacy. Some concerns may arise from risk, or perceived risk, of unauthorized access to or distribution of feeds from image capture devices. Such concerns or perceptions can be elevated for image capture devices that due to desired of meeting the devices' purposes of public safety and security, capture personal identifiable information (PII). Examples of PII that can be captured can include, but are not limited to, the geometry and other features of persons' faces, automobile license plate numbers, and personal name tags.

SUMMARY

According to an embodiment of the present disclosure, there is provided a first explosive simulant. The explosive simulant includes a sheet including a mixture of a boron carbide, an iron oxide, and an ethylene vinyl acetate polymer, in which the components of the mixture are selected such that the sheet has a predetermined flexural modulus, particle density, effective atomic number, and X-ray transmission properties.

Further, according to an embodiment of the present disclosure there is provided a second explosive simulant. The second explosive simulant includes a sheet including a mixture of a calcium carbonate and an ethylene vinyl acetate polymer, wherein the components of the mixture are selected such that the sheet has a predetermined flexural modulus, and millimeter wave properties.

Further, according to an embodiment of the present disclosure, there is provided a method for manufacturing a simulant that imitates the properties of an explosive. The method includes melting and blending ethylene vinyl acetate polymer including a naphthenic plasticizer, adding specific amount of particulate chemicals selected from a group comprising of boron carbide and iron oxide in small increments and mixing to form a uniform mixture, and pouring the uniform mixture in a tray and baking the uniform mixture in a laboratory oven.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The drawing figures illustrate one or more implementations in according with the teachings of this disclosure, by way of example, not by way of limitation. In the figures, like reference numbers refer to the same or similar elements. It will be understood that the drawings are not necessarily to scale.

FIG. 1 is a flow chart of operations in a manufacturing process of an explosive simulant according to an embodiment of the present disclosure.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification does not necessarily refer to the same embodiment. Further, the particular features, structures or characteristics may be combined in any suitable manner in one or more embodiments. Further, it is intended that embodiments of the disclosed subject matter cover modifications and variations thereof.

As used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, Explosive detection systems (EDSs) are machines that use a combination of X-ray scanning and image processing to scan luggage bags and other items to identify the densities and patterns correlating to an explosive or chunks of explosives. Advanced Imaging Technology (AIT) portals scan humans to determine if objects are hidden under their clothing. In order to test and validate these systems, weapons, explosives and simulants are utilized. Simulants for EDS technologies are mainly developed to match the X-ray attenuation properties of the actual explosives, whereas simulants developed for AIT portals are developed to match the scatter and reflectance of either the X-ray or millimeter wave (MMW) properties of the actual explosives.

In one embodiment of the present disclosure, explosive simulants are manufactured for a pentaerythritol tetranitrate (PETN) based sheet explosive (also referred as PETN sheet explosive 2 in table 1). The simulant is initially developed targeting the X-ray properties listed in table 1 followed by the flexural property shown in Table 2. The flexural property relates to the tendency of a material to bend and is typically characterized by calculating the flexural modulus of a material. Further, additional characteristics that can be matched include physical form, X-ray transmission properties, mass density, effective atomic number Z, and tactile properties. The characteristics of the first explosive simulant are compared with the PETN sheet explosive 2 in Table 1.

TABLE 1

Properties of the first explosive simulant

| X-ray properties | PETN Sheet Explosive 2 | New Simulant | Tolerance* |
|---|---|---|---|
| Density (g/cc) | 1.48 | 1.50 | ±0.02 |
| Z effective | 7.81 | 7.76 | ±0.15 |
| High Reveal-CT# | 13801 | 13403 | N/A |
| Low Reveal-CT# | 13692 | 13390 | N/A |

In Table 1, * indicates that the density tolerance was set at 1: 0.02 g/cc based on the inherent range of variation found in commercial and military explosives. CT Number is expressed in Modified Hounsfield Units and is used for comparison, as no tolerance threshold has been established.

An aspect of present disclosure focusses on matching the flexural properties of a sheet explosive as measured on an Instron Universal Test Machine 3342 using a 3-point flex modulus test. Initial flexural modulus tests are performed on a standardized sample of the sheet explosive to determine the target flexural value. The measured flex modulus quantifies the resistance to a bending force of the sheet explosive and provides the target value for the simulant to match.

Simulant development begins with three commercial products of pre-blended Ethylene Vinyl Acetate (EVA) and plasticizer mixed together. The products contain different levels of EVA and plasticizer and by adjusting the relative amounts; you can control the flex modulus of the simulant polymer base. When one increase the amount of plasticizer, the flex modulus goes down. When one lowers the amount of plasticizer, the flex modulus increases (i.e. the sample becomes stiffer and more resistant to bending force). An arbitrary amount of polymer base is then loaded with a fixed amount of solids that will control the X-ray or dielectric properties to match those of the explosive sample. The addition of solids to the polymer base will increase the flex modulus of the overall mixture. A standardized sample of the first simulant prototype formula is tested for flex modulus according the same method used to test the explosive. The results of the simulant and explosive are compared, and depending on the results, the polymer base of the simulant prototype is then adjusted to either increase or decrease the flex modulus in order to compensate for the solids. This is repeated in an iterative process until the target flex modulus is achieved.

The first explosive simulant is a mixture of two or more non-explosive components. In one embodiment, the first explosive simulant includes 57.2% boron carbide with 1.9% iron oxide, suspended in 40.9% ethylene vinyl acetate polymer; specifically 34.9% HB-218 and 6.0% HS-103. Other formulation ingredients may include, but are not limited to, Boron Carbide 49.0-71.0%, Iron Oxide: 0.7-2.5%, Polymer 230: 10.0-34.0%, Polymer 218: 10.0-58.0%, and Polymer 103: 6.0-34.0%. Furthermore, a certain percentage of HB-230 can also be added to the mixture. Polymer blends HS-103, HB-218, and HB-230 are exemplary compounds and other compounds with similar properties can be used. The properties that should be satisfied may include, but are not limited to, density, Z-effective, MAC, electron density, Z-e, (Nitrogen plus Oxygen) to (Carbon plus Hydrogen) ratio, dielectric constant, millimeter wave reflectivity, and flexural modulus. The first explosive simulant has X-ray properties are consistent with the PETN sheet explosive 2, as shown in Table 1. Further, the flexural modulus of the first explosive simulant is approximately equal to those of the PETN sheet explosives and cyclotrimethylenetrinitramine (RDX) sheet explosives, as illustrated in Table 2.

Additionally, as depicted in Table 2, characterization of four different sheet explosives as well as three commercially available sheet explosive simulants was also performed to differentiate the first explosive simulant (referred to as "new simulant" in Table 2) of the present disclosure from the rest. According to the present disclosure, the test utilized a 5.08 cm×7.62 cm sample aliquot taken from a larger sample lot. The specimens were tested only once prior to being discarded. A minimum of ten samples were measured for repeatability purposes. As shown in Table 2, the first explosive simulant, according to an embodiment of the present disclosure, has proven to be a vast improvement over the commercially available sheet explosive simulants. The first explosive simulant also successfully reproduced the targeted X-ray properties of the explosive.

TABLE 2

Flexural Modulus comparison with the first explosive simulant (New Simulant)

| Flexural modulus (ksi) | Explosives | | | | Simulants | | | |
|---|---|---|---|---|---|---|---|---|
| | PETN Sheet Explosive | | RDX Sheet Explosive | | Commercial Product | | | New Simulant |
| | 1 | 2 | 1 | 2 | 1 | 2 | 3 | |
| Average | 0.307 | 0.216 | 0.481 | 0.241 | 2.377 | 2.925 | 1.770 | 0.493 |
| Standard deviation | 0.043 | 0.020 | 0.062 | 0.023 | 0.118 | 0.160 | 0.073 | 0.064 |

The ability to control the flexural modulus is important for the development of new categories of explosive simulants for AIT systems, which significantly rely on physical characteristics. The AIT portals' detection algorithms identify anomalies by examining image contrast, edge effects, and image irregularities. A crucial characteristic for explosive simulants for AIT systems is the ability to conform to a human body in the same manner as that of actual explosives, so that the detection algorithm may not easily discern a given explosive from the background. Additionally, another crucial characteristic in simulant development for AITs is that the explosive simulant also matches the properties of the actual explosive as determined by the AIT system's technology platform (X-ray or MMW).

Two main types of AIT technologies exist, X-ray based and MMW based. The simulants for X-ray based AIT technologies are developed by matching the X-ray properties of the simulants to those of the actual explosive. On the other hand, simulants for MMW based AIT technologies are developed by matching the actual explosive's dielectric response.

In one embodiment of the present disclosure, a second explosive simulant matching the MMW dielectric response and flexural modulus of the explosive is developed. The second explosive simulant formula includes 42.8% calcium carbonate suspended in 57.2% HS-218 ethylene vinyl acetate polymer blend. Other formulation ingredients may include, but are not limited to, Polymer 230: 10.0-34.0%, Polymer 218: 10.0-58.0%, Polymer 103: 6.0-34.0%, and Calcium Carbonate: 38-48%. Table 3 illustrates that the second explosive simulant (referred as MMW sheet simulant in table 3) exhibited dielectric properties similar to those of the PETN sheet explosive 2. The real permittivity $\varepsilon'$ of the PETN Sheet Explosive 2 and the second explosive simulant are also approximately the same. In addition, the flexural moduli of the two are also approximately similar.

TABLE 3

MMW Sheet Simulant Results

| Sample | Real $\varepsilon'$ | Imaginary $\varepsilon''$ | Flexural Modulus (ksi) |
|---|---|---|---|
| PETN Sheet Explosive 2 | 2.82 | 0.16 | 0.216 |
| MMW Sheet Simulant | 2.77 | 0.01 | 0.190 |

The first explosive simulant and the second explosive simulant can be manufactured in a similar manner as illustrated in FIG. 1.

FIG. 1 illustrates the manufacturing process of an explosive simulant according to an embodiment of the present disclosure. In step 101, the ethylene vinyl acetate (EVA) polymer containing a naphthenic plasticizer is melted and blended by applying compression, such as using a two-roll mill machine. The plasticizer renders the mixture easier to process in calendaring, tubing, and embossing operations. It also renders the mixture more plastic for shaping operations. In step 303, specific amounts of particulate chemicals (such as boron carbide, iron oxide, and calcium carbonate) are added in small increments and are mixed uniformly with the EVA to produce a mixture that achieves a target density and Z-effective. In step 105, the mixture is poured into a tray or mold and placed in a laboratory oven for baking. During the baking process, the mixture flows into a sheet of predetermined thickness, due to gravity.

The baking process may be visually observed and the baking (application of heat/temperature) may be stopped when the mixture forms into a sheet. The area and thickness of the sheet is determined by the dimensions of the tray or mold. The baking may be performed at various temperatures for different ranges of time. For example, the oven can be set to 115° C. and baking can be carried out for 10 minutes while varying temperatures of 105-130° C. and times of 10-120 minutes being found to be acceptable when varying the amount of material being manufactured.

To produce higher density sheet explosive simulants, the composition of the polymer with naphthenic plasticizer may need to be altered to achieve the desired density while remaining cross linked. The change in the polymer blend results in the ability to add a larger concentration of particle matter, in addition to being more flexible. A final set of fifty-six (56) parametric sheets were produced, each sheet measuring 38×25×0.5 cm and covering a density range from 1.40 to 1.75 and Z-effective range of 7.00 to 8.50. The flexibility of the sheets, due to the variation of polymer blends in the sheets.

Commercially available sheet explosive simulants are predominantly designed for matching the X-ray properties of an actual explosive. Furthermore, they rarely incorporate the tactile properties and flexural properties of the explosive into the attributes of the explosive simulant. If the flexibility of an explosive simulant does not adequately match that of the actual explosive that the simulant is meant to simulate, there could be effects on the shape and packaging of the explosive simulant that lead to differences in the images obtained from AIT portals. This may potentially lead to erroneous conclusions from AIT testing. For instance, a stiff rectangular shaped simulant cannot conform to the curvature of human body, and as such can be easily identified by the AIT portal unlike an actual explosive that does conform. Characterizing the physical flexural properties of an explosive and incorporating those parameters into the explosive simulant provides another layer of fidelity, creating an explosive simulant that is nearly identical to the actual explosive (except for its blast properties) as detected by a scanning technology. This addition of mimicking an explosive's flexibility directly affects the correlation between material properties and AIT threat detection algorithms. Otherwise, if the simulant and explosive differ in flexibility the AIT's detection response may be different because of the morphology effects, e.g., edge effects or stiffness In one embodiment, the explosive simulants are designed to withstand multiple uses involving significant bending. In contrast, explosives are generally designed to be used once. Therefore, the explosive simulants manufactured according to the process in FIG. 1 in the present disclosure are advantageous because the flexural modulus can be modified such that the explosive simulants has significantly better flexural properties than the explosive. The development of an extremely flexible explosive simulant specifically for testing detection systems could be beneficial in pushing the boundaries of detection and identifying possible vulnerabilities of the system and detection algorithms.

While certain embodiments have been described, these embodiments have been presented by way of example only, and are not intended to limit the scope of the present disclosures. Indeed, the novel methods, apparatuses and systems described herein can be embodied in a variety of other forms. Furthermore, various omissions, substitutions and changes in the form of the methods and apparatuses described herein can be made without departing from the spirit of the present disclosures. The accompanying claims and their equivalents are intended to cover such forms or modifications as would fall within the scope and spirit of the present disclosures.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

CONCLUSION

Although the subject matter has been described in language specific to example structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A method for manufacturing an explosive simulant that imitates a flexural modulus property and millimeter wave properties or X-ray properties, or both, of an explosive, the method comprising:
   melting and blending an amount of ethylene vinyl acetate (EVA) polymer that includes an amount of a plasticizer;
   adding to the EVA polymer an amount of at least one compound, the at least one compound being from the group consisting of boron carbide and iron oxide, and mixing to form a uniform mixture;
   pouring the uniform mixture into a tray or mold; and
   heating the uniform mixture in the tray or mold until the uniform mixture flows, forming a sheet of the explosive simulant;
   the amount of the EVA polymer and the amount of the at least one compound being in accordance with the flexural modulus property and the millimeter wave properties or the X-ray properties, or both, of the explosive.

2. The method according to claim 1, the EVA comprising a naphthenic plasticizer.

3. The method according to claim 1, further comprising the at least one compound including boron carbide and iron oxide.

4. The method according to claim 1, further comprising the explosive simulant consisting of 49.0-71.0% boron carbide, 0.7-2.5% iron oxide, and 25.0-58.0% EVA polymer.

5. The method according to claim 1, further comprising the melting and blending being performed using a two-roll mill machine.

6. The method according to claim 1, further comprising the melting and blending including applying a pressure mixing to the EVA polymer.

7. The method according to claim 1, further comprising the heating of the uniform mixture in the tray or mold including heating at a temperature of 105° C.-130° C. for 10-120 minutes.

8. The method according to claim 1, further comprising:
   the amount of the plasticizer in the EVA polymer and the amount of the at least one compound being at respective values that provide the sheet with
      a flexural modulus approximately equal to flexural modulus of pentaerythritol tetranitrate (PETN) sheet explosive, and
      X-ray transmission approximately equal to X-ray transmission of PETN sheet explosive, or millimeter wave properties approximately equal to millimeter wave properties of PETN sheet explosive, or both.

9. The method according to claim 1, further comprising:
   the amount of the plasticizer in the EVA polymer and the amount of the at least one compound being at respective values that provide the sheet with
      a flexural modulus approximately equal to flexural modulus of cyclotrimethylenetrinitramine (RDX) sheet explosive, and
      X-ray transmission approximately equal to X-ray transmission of RDX sheet explosive, or millimeter wave properties approximately equal to millimeter wave properties of RDX sheet explosive, or both.

10. The method according to claim 1, further comprising: the heating including heating, in an oven, the uniform mixture in the tray or mold.

11. The method according to claim 1, further comprising determining a thickness and area of the sheet by configuring dimensions of the tray or mold.

12. The method according to claim 1, further comprising providing the sheet with
   dielectric properties similar to the dielectric properties of RDX sheet explosive, by at least setting the amount of the at least one compound, and
   flexural modulus similar to the flexural modulus of RDX sheet explosive, and by at least setting an amount of the plasticizer in the EVA polymer.

* * * * *